United States Patent [19]
Okawa et al.

[11] Patent Number: 6,078,915
[45] Date of Patent: *Jun. 20, 2000

[54] INFORMATION PROCESSING SYSTEM

[75] Inventors: Toru Okawa; Ryuichi Matsukura; Yasuo Sato, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/755,763

[22] Filed: Nov. 21, 1996

[30] Foreign Application Priority Data

Nov. 22, 1995 [JP] Japan ................................. 7-304033

[51] Int. Cl.$^7$ ...................................................... G06F 17/30
[52] U.S. Cl. .................................................... 707/5; 707/3
[58] Field of Search ............................... 707/1, 100, 101, 707/102, 103, 104, 200, 500, 530; 704/2, 4, 9; 382/177, 203, 229

[56] References Cited

U.S. PATENT DOCUMENTS

| | | | |
|---|---|---|---|
| 5,159,667 | 10/1992 | Borrey et al. | 707/500 |
| 5,325,444 | 6/1994 | Cass et al. | 382/177 |
| 5,491,760 | 2/1996 | Withgott et al. | 382/203 |
| 5,675,815 | 10/1997 | Yamauchi et al. | 707/530 |
| 5,680,223 | 10/1997 | Cooper et al. | 358/403 |

FOREIGN PATENT DOCUMENTS

| | | |
|---|---|---|
| 58-051389 | 3/1983 | Japan . |
| 60-222916 | 11/1985 | Japan . |
| 61-231630 | 10/1986 | Japan . |
| 1-163799 | 6/1989 | Japan . |
| 2-165380 | 6/1990 | Japan . |
| 3-20870 | 1/1991 | Japan . |
| 5-108878 | 4/1993 | Japan . |
| 6-208654 | 7/1994 | Japan . |

*Primary Examiner*—Ruay Lian Ho
*Attorney, Agent, or Firm*—Staas & Halsey LLP

[57] ABSTRACT

An information processing system for processing a document including non-coded data comprising an extracting unit for extracting non-coded data included in the document, a label information making unit for making a label information item from the non-coded data, the label information item representing a feature of the non-coded data, a management unit for managing documents so that each of the documents corresponds to the label information item, and a retrieval unit for, when a label information item is supplied as a retrieval key, retrieving a document which is managed so that the document corresponds to a label information item substantially identical to the specified label information item, from documents managed by the management unit.

20 Claims, 14 Drawing Sheets

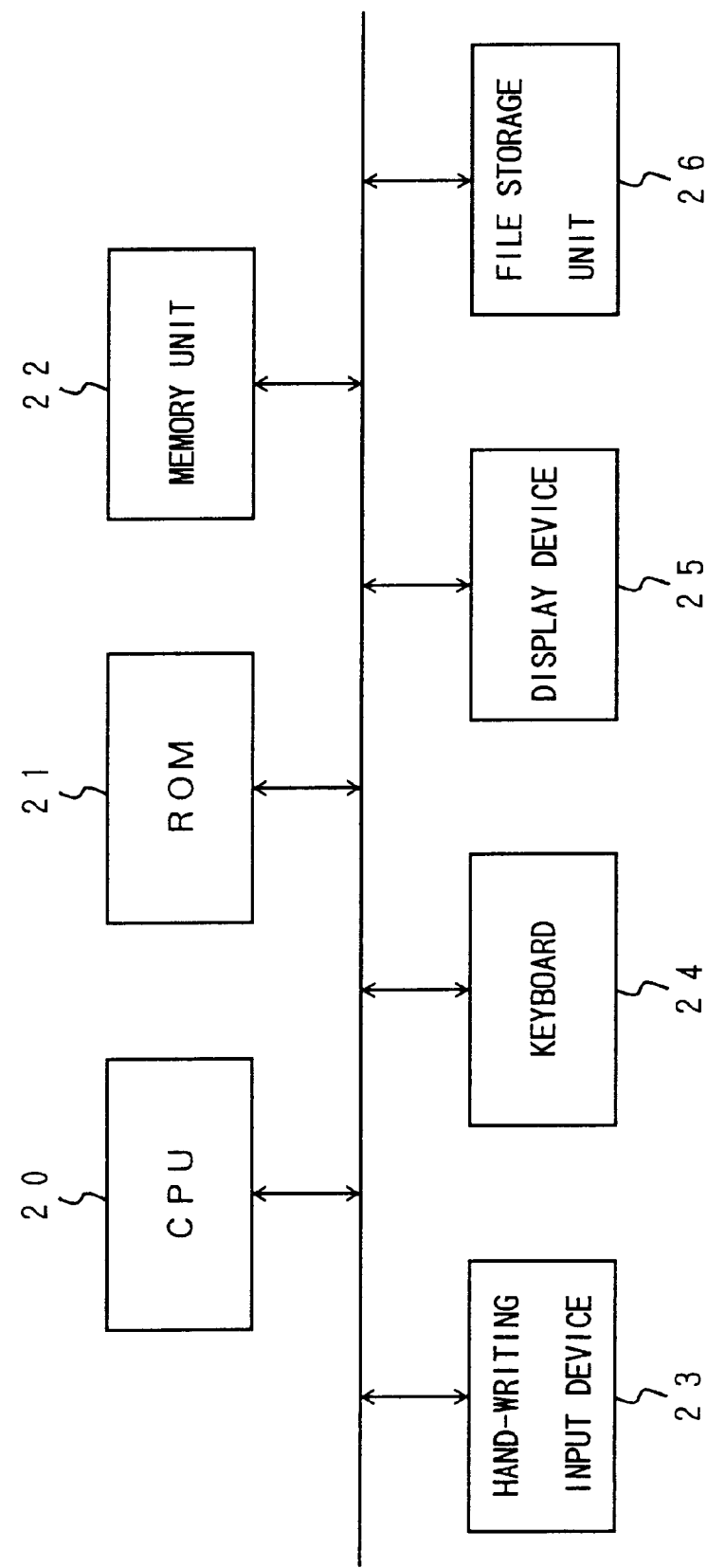

FIG. 5
(a) 
(b) 
(c) 
FIG. 6
(a) 
(b) 
(c) 

| LABEL | POINTER |
|---|---|
| L (○) | P a |
| L (×) | P b |
| L (△) | P c |
| L (□) | P d |

FIG. 11

| IMAGE DATA DOCUMENT | LABEL |
|---|---|
| A A A | L (○) |
| B B B | L (□) |
| ⋮ | ⋮ |

INFORMATION PROCESSING SYSTEM

BACKGROUND OF THE INVENTION (1) Field of the invention

The present invention generally relates to an information processing system for processing documents including non-coded data, such as image data and audio data, and more particularly to an information processing system in which a retrieving process based on non-coded data is allowable.

(2) Description of the Related Art

In an information processing system in which processes for making, editing and retrieving documents are performed, coded data such as character data and symbol data and non-coded data such as image data and audio data are processed. In the retrieving process performed in such a system, specific characters or symbols are retrieved from coded characters and symbols included in a document. In addition, a document including specific coded characters or symbols (Key Words) is retrieved from documents stored in a storage unit.

However, in the conventional information processing system, a retrieving process is not performed based on non-coded data such as image data and audio data. For example, it is allowable neither to retrieve specific image and/or audio data from a document nor to retrieve a document including a specific image and/or audio data from a group of documents stored in the storage unit.

SUMMARY OF THE INVENTION

Accordingly, a general object of the present invention is to provide a novel and useful information processing system in which the disadvantages of the aforementioned prior art are eliminated.

A specific object of the present invention is to provide an information processing system in which a retrieving process is performed based on non-coded data such as image data and audio data.

The above objects of the present invention are achieved by an information processing system for processing a document including non-coded data, the non-coded data being data which is not coded, the system comprising: extracting means for extracting non-coded data included in the document; label information making means for making a label information item from the non-coded data extracted by the extracting means, the label information item representing a feature of the non-coded data; management means for managing documents so that each of the documents corresponds to the label information item made by the label information making means; and retrieval means for, when a label information item is supplied as a retrieval key, retrieving a document which is managed so that the document corresponds to a label information item substantially identical to the specified label information item, from documents managed by the management means.

The above objects are also achieved by an information processing system for processing a document including non-coded data, the non-coded data being data which is not coded, the system comprising: extracting means for, when receiving a retrieval request, extracting non-coded data included in a specified document; label information making means for making a label information item from the non-coded data extracted by the extracting means, the label information item representing a feature of the non-coded data; and determination means for determining whether a label information item supplied as a retrieval key along with the retrieval request is substantially identical to the label information item made by the label information making means, wherein when the determination means determines that both the label information items are substantially identical to each other, a retrieval result based on a determination result generated by the determination means is obtained.

According to the present invention, a label information item is made from a part of non-coded data of a document, and a document is retrieved based on the relationship between the document and the label information item. Thus, the retrieval process based on the non-coded data such as image data and sound data can be carried out.

Another object of the present invention is to provide a recording medium storing a program which causes a computer to perform processes which should be performed by the information processing system.

The object of the present invention is achieved by a computer readable recording medium storing a program for causing a computer to process a document including non-coded data, the non-coded data being data which is not coded, the program comprising: extracting program means for extracting non-coded data included in the document; label information making program means for making a label information item from the non-coded data extracted by the extracting program means, the label information item representing a feature of the non-coded data; program means for supplying a relationship between the document and the label information item made by the label information making program means to a management unit which manages documents so that each of the documents corresponds to the label information item made by the label information making program means; and retrieval program means for, when a label information item is supplied as a retrieval key, retrieving a document which is managed so that the document corresponds to a label information item substantially identical to the specified label information item, from documents managed by the management means.

The above object of the present invention is also achieve by a computer readable recording medium storing a program for causing a computer to process a document including non-coded data, the non-coded data being data which is not coded, the program comprising: extracting program means for, when receiving a retrieval request, extracting non-coded data included in a specified document; label information making program means for making a label information item from the non-coded data extracted by the extracting program means, the label information item representing a feature of the non-coded data; and determination program means for determining whether a label information item supplied as a retrieval key along with the retrieval request is substantially identical to the label information item made by the label information making program means, wherein when the determination means determines that both the label information items are substantially identical to each other, a retrieval result based on a determination result generated by the determination program means is obtained.

BRIEF DESCRIPTION OF THE DRAWINGS

Other objects, features and advantages of the present invention will be apparent from the following description when read in conjunction with the accompanying drawings, in which:

FIG. 2 is a block diagram illustrating hardware of a system according to an embodiment of the present invention;

FIG. 5 is a diagram illustrating examples of images which may be drawn in the specific area of a document;

FIG. 6 is a diagram illustrating other examples of images which may be drawn in the specific area of a document;

FIG. 9 is other examples of images which may be drawn in the specific area of a document;

FIG. 10 is a diagram illustrating a label storing position table indicating relationships between label information items and positions at which the label information items are stored;

FIG. 11 is a diagram illustrating a label management table indicating relationships between label information items and documents;

DESCRIPTION OF THE PREFERRED EMBODIMENTS

A description will be given of an embodiment of the present invention.

Figure 1:
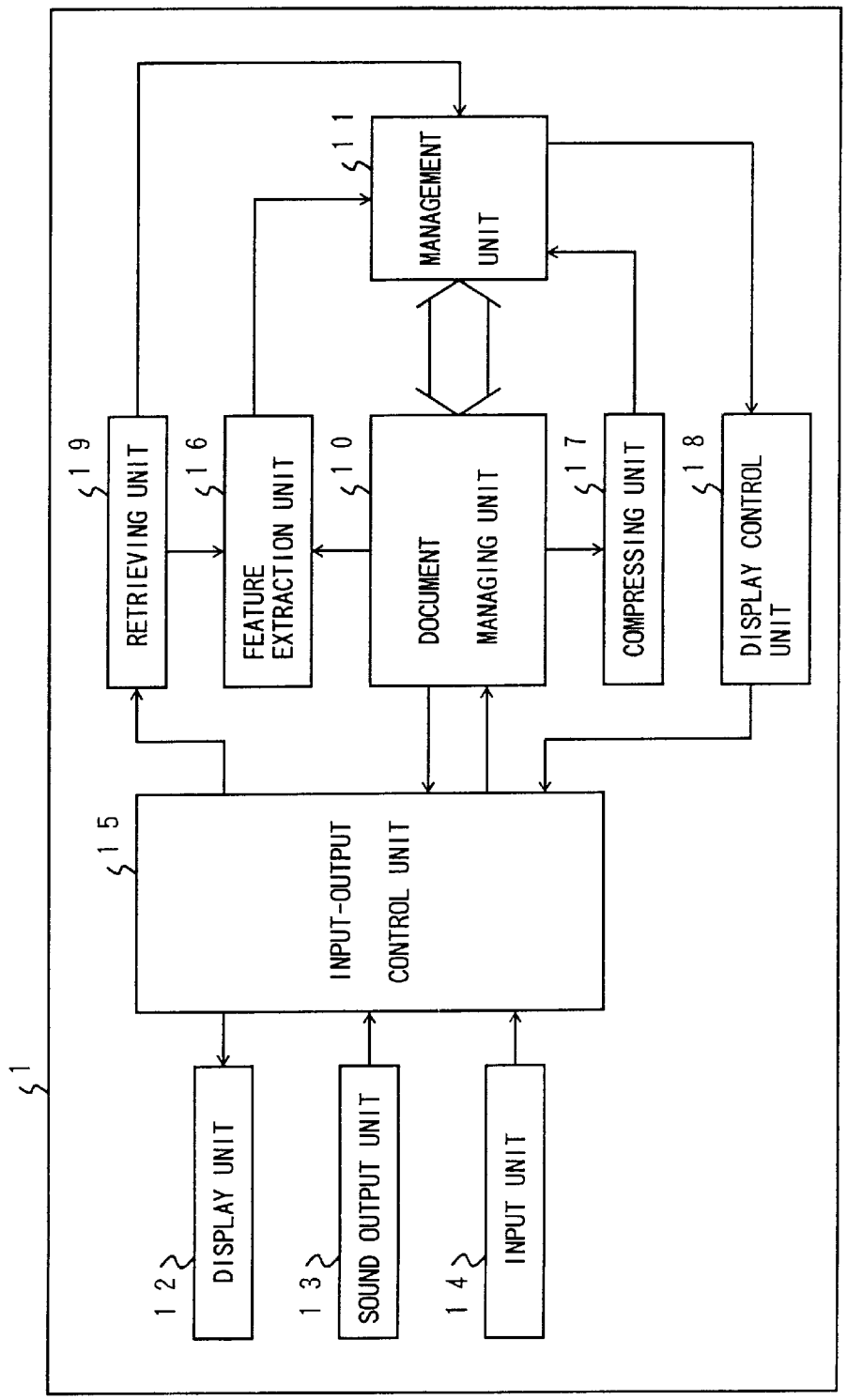
FIG. 1 is a block diagram illustrating a functional structure of a system according to an embodiment of the present invention.

An information processing system according to an embodiment of the present invention is formed in a computer system. A functional structure of the information processing system is formed as shown in FIG. 1. In this information processing system, media data which is constituted of at least one of image data and audio data is processed (made, edited and retrieved). Referring to FIG. 1, an information processing system 1 has a document managing unit 10, a management unit 11, a display unit 12, a sound output unit 13, an input unit 14, an input-output control unit 15, a feature extraction unit 16, a compressing unit 17, a display control unit 18 and a retrieving unit 19.

The document managing unit 10 manages documents (including media data) which are processed in system 1. The management unit 11 manages relationships between the documents managed by the document managing unit 10 and label information which will be described later. The display unit 12 displays documents which are managed by the document managing unit 10. In a case where audio data is included in a document as the media data, the sound output unit 13 outputs sound based on the audio data. The input unit 14 is used to input a document including media data and data of retrieval keys to this system.

The input-output control unit 15 performs interface processes with respect to the display unit 12, the sound output unit 13 and the input unit 14. A document managed by the document managing unit 10 is supplied to the display unit 12 via the input-output control unit 15 and displayed on the display unit 12. Audio data (the media data) included in a document managed by the document managing unit 10 is supplied to the sound output unit 13 via the input-output control unit 15, and sound based on the audio data is output from the sound output unit 13. A document input from the input unit 14 is supplied to the document managing unit 10 via the input-output control unit 15, and managed by the document managing unit 10.

The feature extraction unit 16 extracts media data from a document managed by the document managing unit 10, and extracts, from the media data, feature data indicating features of the media data. The feature data is supplied to the management unit 11 as label information. For example, in a case where the media data has a pattern, the amount of a frequency component included in the pattern is calculated as the feature data. In addition, for example, in a case where the media data is formed of image data, a block number which is the number of image blocks (characters, symbols and the like) included in the image is extracted as the feature data. Further, for example, in a case where the media data is formed of audio data, the value of a main frequency component (e.g., 8 KHz) of the audio data is extracted as the feature data.

In a case where the media data extracted from a document managed by the document managing unit 10 is formed of image data, the compressing unit 17 makes miniature data to which a part or all of the extracted image data is miniaturized (normalized at a predetermined size). The compressing unit 17 can also calculate skeleton data which represents simplified image data. The skeleton data represents a triangle, a square, a circle or the like to which the image data is simplified. The miniature data or the skeleton data which is made or calculated by the compressing unit 17 is supplied to the management unit 11 as the label information.

The management unit 11 receives the label information from the feature extraction unit 16 and the compressing unit 17, and manages the relationship between the document including the media data which is the base of the label information. That is, when label information is supplied, a document corresponding to the label information can be specified based on the relationship managed by the management unit 11.

The display control unit 18 makes a list of label information items which are managed in the relationships to documents by the management unit 11, and causes the list of the label information items to be displayed on the display unit 12.

The retrieving unit 19 retrieves a document corresponding to a retrieval key input from the input unit 14 from documents managed by the document managing unit 10. Concretely, a label information item substantially identical to the input retrieval key is retrieved from the label information items which are managed in the relationships to the documents by the management unit 11. A document corresponding to the retrieved label information item is then specified. Finally, the specified document is obtained as the retrieval result.

The list of label information items which are managed in the relationships to the documents by the management unit 11 may be displayed on the display unit 12 under the control of the display control unit 18. In this case, when an operation for selecting a label information item from the list is performed, the selected label information item is supplied to the retrieving unit 19. The retrieving unit 19 uses the supplied label information item as the retrieval key and performs the same process as in the above case.

The management unit 11 which manages the relationships between the documents managed by the document managing unit 10 and the label information items may be omitted from this system. In this case, the retrieving unit 19 specifies a document among from the documents managed by the document managing unit 10, and obtains a label information which is generated, by the feature extraction unit 16 or the compressing unit 17, from the media data extracted from the specified document. Further, the retrieving unit 19 determines whether the label information item is substantially identical to the retrieval key input from the input unit 14. If they are substantially identical to each other, the retrieving unit 19 can output, as the retrieval result, "media data" which is the base of the label information item. In this case, the retrieving process corresponds to a process for retrieving media data identical to a retrieval key from a specified document. The retrieving unit 19 can output, as the retrieval result, a "document" including media data which is the base of the label information item. In this case, the retrieving process corresponds to a process for retrieving a document corresponding to the retrieval key from the documents managed by the document managing unit 10.

According to the information processing system having the above functions, since the label information item (representing the feature of the media data which is not coded) corresponds to a document including the media data, the retrieving process can be performed based on the label information item. As a result, the retrieving process can be performed substantially based on the media data (the non-coded data) which is the base of the label information item.

A concrete description will now be given of the information processing system according to the embodiment of the present invention.

The hardware structure of the information processing system is formed as shown in FIG. 2. This system is constituted, for example, in a portable computer terminal in which hand-writing input operations are allowable. Referring to FIG. 2, the system has a CPU (Central Processing Unit) 20, a ROM (Read Only Memory) 21, a memory unit 22, a hand-writing input device 21, a keyboard 24, a display device 25 and a file storage unit 26, all of which are connected to a bus.

Various programs are stored in the ROM 21. The programs stored in the ROM 21 include a program of a process which should be performed in the system according to the present invention. That is, the ROM 21 corresponds to the "recording medium" in claims. The CPU 20 carries out a document making process, a document editing process, a document managing process, a document retrieving process and the like in accordance with programs stored in the ROM 21.

The memory unit 22 stores data obtained in processes executed by the CPU 20 and is used as a working memory. The hand-writing input device 23 is used to input hand-written characters, line drawings and the like. The keyboard 24 is used to input codes of characters, symbols and the like by key operations. The display device 25 is constituted, for example, of a LCD (Liquid Crystal Device) panel, and displays documents which are made and edited in the system. The file storage unit 26 is constituted, for example, of an EEPROM, a RAM unit with a back-up battery and the like, and stores documents and tables which are made in the system.

Figure 3A:
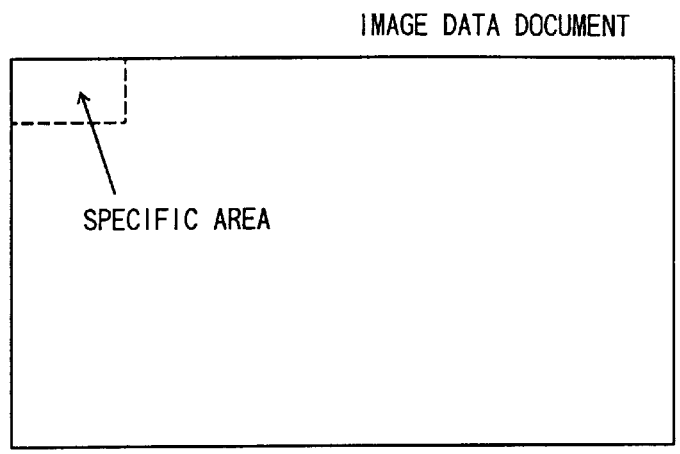
FIGS. 3A, 3B and 3C are diagrams illustrating examples of specific areas of image data documents.

In the system described above, a document is made and edited by using line drawings and hand-written characters input from the hand-writing input device 23 and characters and symbols which codes are input from the input unit 24. Further, on a specific area thereof the document which has been edited is provided with a mark written by the hand-writing input device 23. For example, an area located, as shown in FIG. 3A, at the leading portion of the document may be decided as the specific area. The mark attached to the specific area can be used for rough classification (e.g., rank of importance) of documents. A single circle o as shown in FIG. 5(a), a set of two circles oo as shown in FIG. 5(b) and a set of three circles ooo as shown in FIG. 5(c) are used as the mark which should be attached to the specific area of the document.

After making and editing the document and the entry of the mark to the specific area of the document as described above are completed, the CPU 20 carries out a process for storing the document (including image data and hereinafter referred to as an image data document) in accordance with a procedure shown in FIG. 4.

Figure 4:
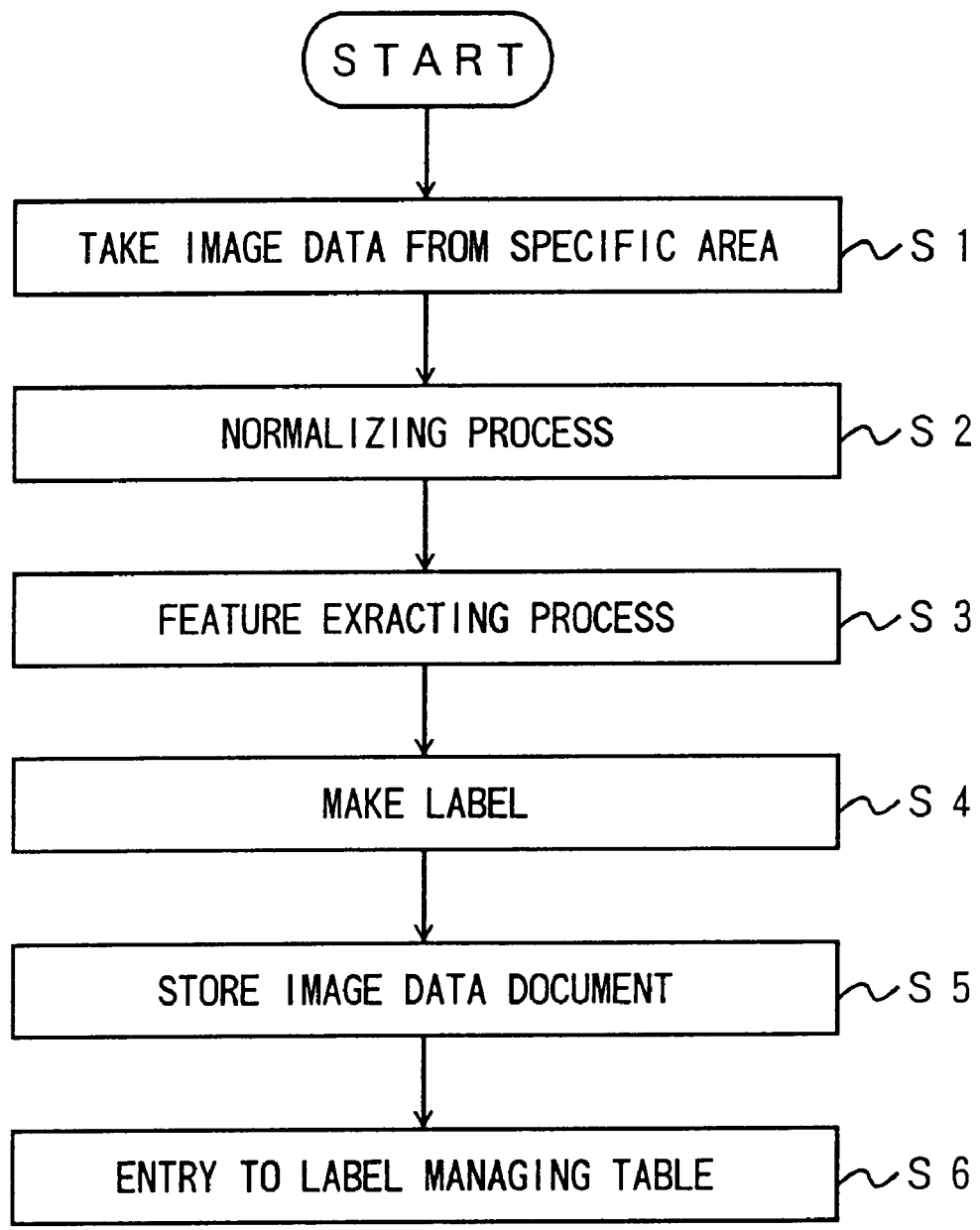
FIG. 4 is a flowchart illustrating an example of a processing procedure for storing a document made.

Referring to FIG. 4, the CPU 20 takes image data located in the specific area of the document (S1). The CPU 20 then carries out a normalizing process to normalize the size of an image represented by the image data (S2). The image is generally miniaturized by the normalizing process. After this, the CPU 20 extracts the feature from the normalized image data (S3). The step S3 corresponds to the feature extraction unit 16 shown in FIG. 1. For example, the number of image blocks included in the image represented by the normalized image data, namely the block number, is extracted as the feature.

In the cases where the single circle o, the set of two circles oo and the set of three circles ooo as shown in FIGS. 5 (a), (b) and (c) are used as the mark to be attached to the document, the block numbers are respectively "1", "2" and "3". The CPU 20 makes a label information item corresponding to the image data document defined by the block number (S4). The CPU 20 then stores the image data document which was made or edited in the file storage unit 26 (S5). A table indicating a relationship between the image data document (the title) and a position at which the image data document is stored is formed in the file storage unit 26 so that the relationship is managed in the system. This function corresponds to the document managing unit 10 shown in FIG. 1.

Figure 7:
FIG. 7 is a diagram illustrating a label management table indicating relationships between documents and label information items.

In addition, as shown in FIG. 7, a label managing table indicating relationships between the label information items (in this example, the block numbers a, b, . . . ) and image data documents (titles AAA, BBB, . . . )is formed in the file storage unit 26. When a label information item is made as has been described above, the label information item is entered in the label managing table so as to correspond to the image data document which was made or edited (S6). The relationship between the image data document and the label information item is managed using the label managing table. This function corresponds to the management unit 11 shown in FIG. 1.

As has been described above, every time an image data document is made, a label information item is made based on image data (the mark) located in the specific area and the image data document is stored in the file storage unit 26. The relationship between the image data document and the label information item is then entered in the label managing table.

Figure 8:
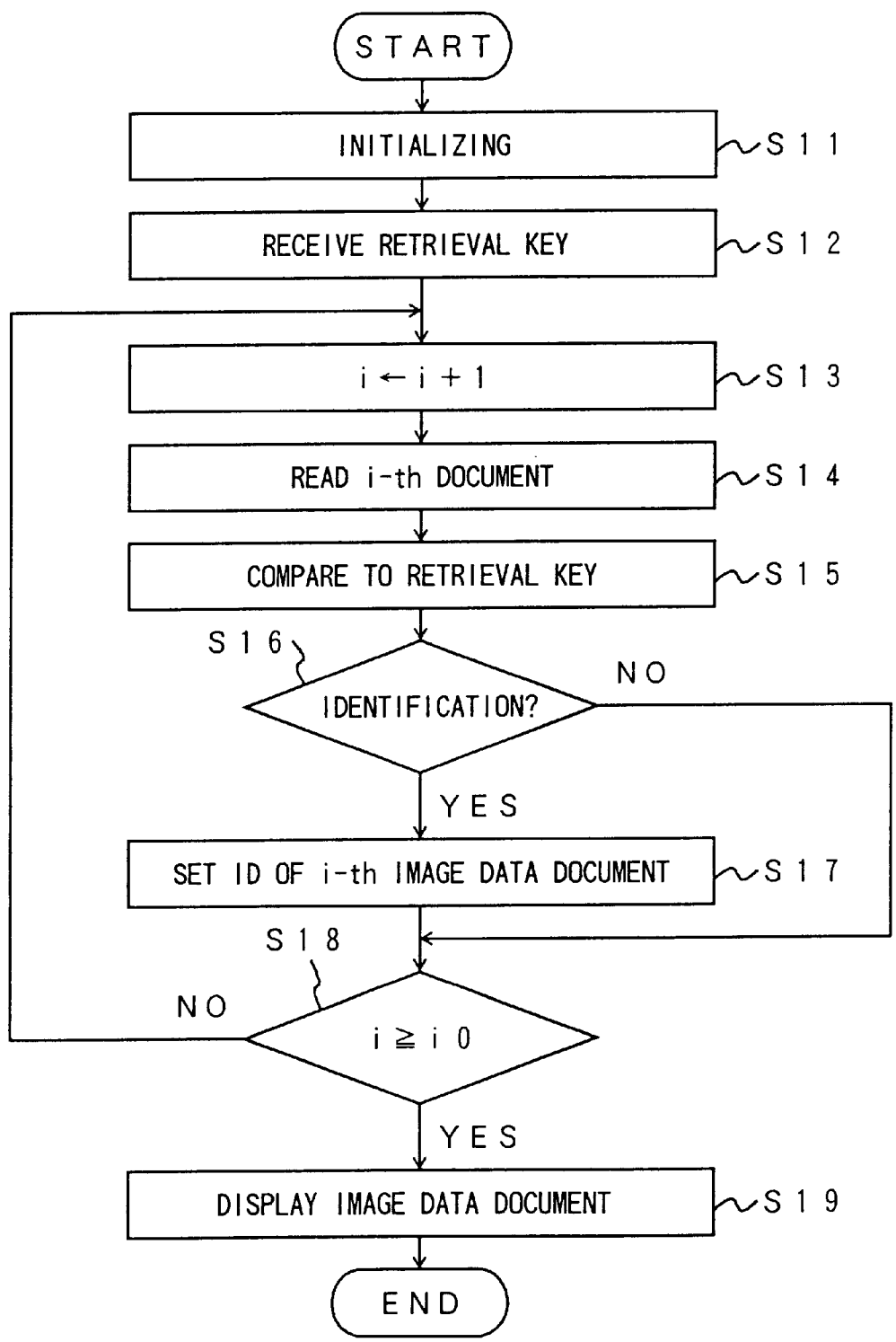
FIG. 8 is a flowchart illustrating an example of a document retrieval processing procedure.

For example, a user has decided that the set of three circles ○○○ (see FIG. 5(c)) should be drawn in the specific area of the most important documents. In this case, the user inputs the block number of "3" as a retrieval key using the keyboard 24 or the hand-writing input device 23 to retrieve the most important documents. When the retrieval key is input to the system as described above, the CPU 20 starts to carry out a retrieving process in accordance with a procedure as shown in FIG. 8. The retrieving process corresponds to the retrieving unit 19 shown in FIG. 1.

After initializing internal factors (S11), the CPU 20 receives the retrieval key (the block number of "3") input by the user (S12). The CPU 20 then increments a counter value i initialized at "0" by one (i=1) (S13) and reads a label information item corresponding to an i-th (i=1) image data document out of the label managing table (see FIG. 7) (S14).

The CPU 20 then compares the retrieval key and the label information item (S15) and determines whether they are identical to each other (S16). If the retrieval key and the label information item is identical to each other, the CPU 20 sets an ID (e.g., a document reference number) of the i-th image data document in a predetermined register (S17). In addition, if the retrieval key is not identical to the label information, or after the ID of the image data document is set in the register, the CPU 20 determines whether the counter value i reaches a number $i_o$ of all the documents stored in the file storage unit 26 (i≧i) (S18). If the counter value i has not reached the number io of all the documents stored in the file storage unit 26, the counter value i is incremented by one (i←i+1), and the retrieval key is compared with a label information corresponding to the next document.

After this, until the counter value i reaches the number $i_o$ of all the documents stored in the file storage unit 26, the above processing steps are repeated. When the counter value i reaches the number $i_o$ of all the documents in the file storage unit 26 (when the retrieval key has been completely compared with label information items corresponding to all the documents), the CPU 20 causes the display device 25 to display a list of the IDs of image data documents set in the register at this time (S19). That is, the list of documents of the block number "3" (in each of which the set of three circles ○○○ is entered in the specific area) specified by the retrieval key is displayed on the screen of the display device 25.

When the user selects one of the documents in the list using the hand-writing input device 23, the selected document is read out of the file storage unit 26 and displayed on the screen of the display device 25.

In the system as has been described above, the label information item is made from the feature of image data (the hand-written circles) included in the document, and the relationship between the label information item and the document is managed. When a label information item is supplied as a retrieval key to the system, the document is retrieved based on the relationship between the label information item and the document. As a result, the retrieving process for the document can be performed based on the image data (the hand-written circles).

In the system in which the block number is extracted as the feature from the received image data, various types of images from which image blocks can be extracted can be used as the marks to be entered in the specific area of the document. For example, a single triangle Δ as shown in FIG. 6(a), a set of two triangles ΔΔ as shown in FIG. 6(b) and a set of three triangles ΔΔΔ as shown in FIG. 6(c) can be used as the mark to be attached to the document. In this case, the block numbers of the single triangle Δ, the set of two triangles ΔΔ and the set of three triangles ΔΔΔ are respectively "1", "2" and "3".

The label information item can be made based on the following feature of image data.

Image data in the specific area is processed by two dimensional Fourier analysis, and the amount of a frequency component obtained by the process may be extracted as the feature of the image data. A color component of image data in the specific area may be also extracted as the feature of the image data. The label information item can be made based on the above feature.

Although, in the above example, the label information item is made based on the feature extracted from image data, the label information item can be made based on a miniaturized image obtained by miniaturizing the image data.

A description will now be given of an example in which ○, ×, Δ and □ as shown in FIG. 9 are used as the mark which should be entered in the specific area of a document.

At the termination of making or editing a document, one of four types of marks indicated above is entered in the specific area (the leading portion) of the document using the hand-writing input device 23. In this case, the CPU 20 executes a process in accordance with substantially the same procedure as in the case shown in FIG. 4. That is, after taking image data (corresponding to one of the four types of marks ○, ×, Δ and □) in the specific area (S1), the CPU 20 carries out the normalizing process for the image data (S2), so that image data having a normalized size (generally, miniaturized image data) is generated (a thumb-nail process). This processing step corresponds to the compressing unit 17 shown in FIG. 1. A label image information item is made based on the normalized image data (S4). The document which is made or edited is file storage unit 26 (S5).

The relationship between the label image information item and the document is managed in the following manner.

The label image information item (the miniaturized image data) is stored in the file storage unit 26. A position (a pointer value) at which the label image information is stored is entered in a label storing position table as shown in FIG. 10. The label storing position table indicates the relationship between the label image information item and the storing position thereof. The label storing position table is constituted in the file storage unit 26. After the position at which the label image information item is stored is entered in the label storing position table as has been described above, a relationship between the document (e.g., AAA or BBBB) and the label image information item is entered in a label managing table as shown in FIG. 11 (S6 shown in FIG. 4).

Figure 12:
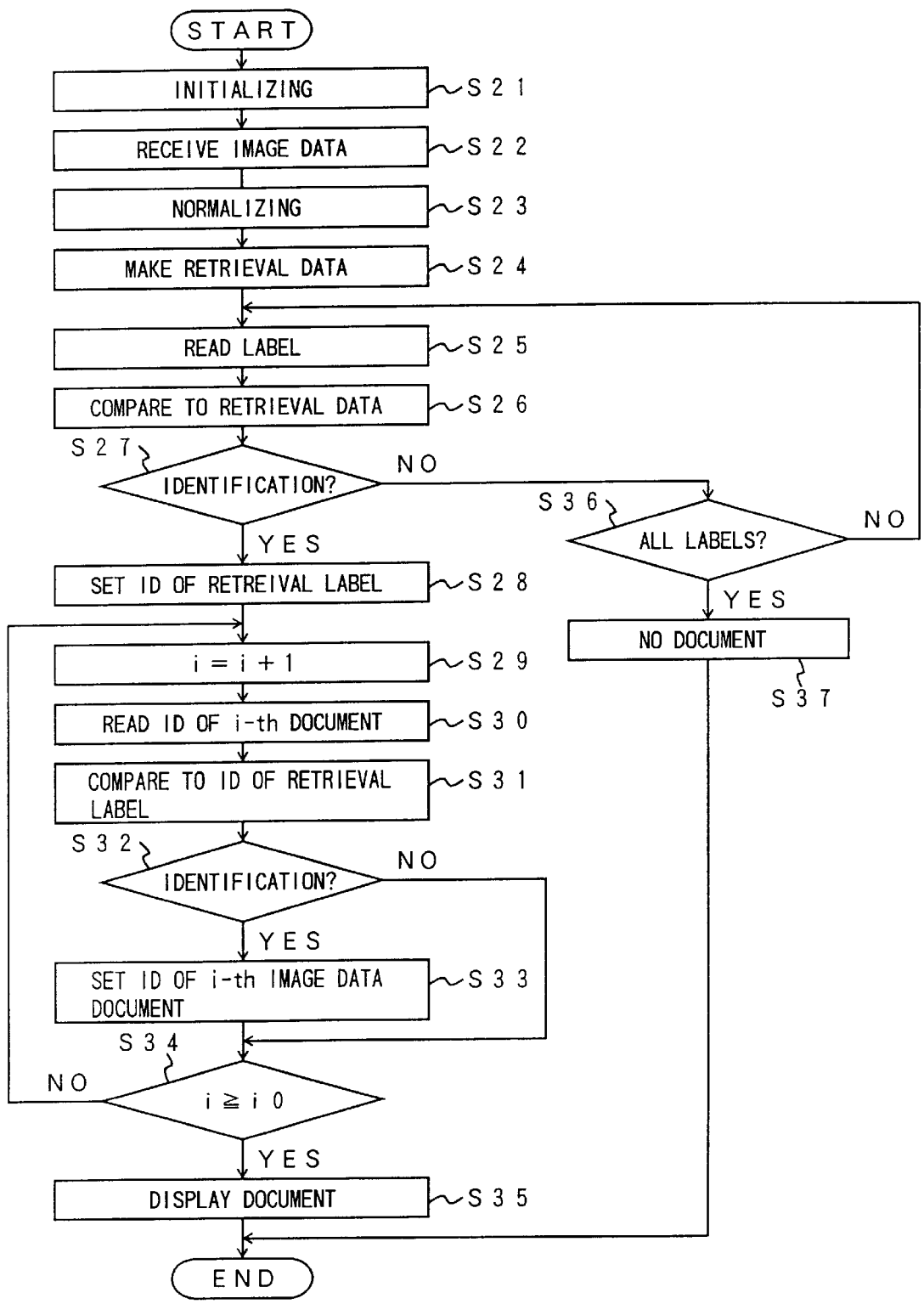
FIG. 12 is a flowchart illustrating an example of a document retrieval processing procedure.

The retrieval process for a document which corresponds to the label image information and has been stored in the file storage unit 26 is carried out in accordance with a procedure as shown in FIG. 12.

To retrieve a document to which one of the four types of marks ○, ×, Δ and □ is attached, the user inputs the mark as a retrieval key using the hand-writing input device 23. In response to the above operation, the CPU 20 initializes respective factors (S21) and receives image data of the input mark (S22). The CPU 20 then carries out a normalizing process with respect to the image information received in step S22 (S23), and generates, from the normalized image data, retrieval data corresponding to a label image information item to be retrieved (S24).

After the retrieval data is generated as has been described above, the CPU 20 reads out a label image information item from the file storage unit 26 with respect to the label storing position table (see FIG. 10)(S25). The CPU 20 then compares the label image information item read out in step S25 with the retrieval data (S26), and determines whether they are identical to each other (S27). The comparing and determining processes in step S26 and S27 include a general image recognition process. In the image recognition process, it is determined that a label image information item having a similarity of a predetermined level with respect to the retrieval data is substantially identical to the retrieval data.

If the label image information item is not identical to the retrieval data, comparing a label image information item managed by the label storing position table and the retrieval data with each other and determining whether they are identical in the same manner as in the above is repeated (S36, S25, S26 and S27). When it is determined that a label image information item is identical to the retrieval data, the CPU 20 sets an ID of the label image information item in a register as an ID of a label image information which should be retrieved (a retrieval label)(S28).

After this, the CPU 20 increments an initialized counter value i (i=0) by one (S29), and reads out the ID of the label image information item corresponding to the i-th document (i=1) from the label managing table (see FIG. 11)(S30). The CPU 20 then compares the ID of the retrieval label set in the register (in step S28) and the ID of the label image information read out of the label managing table with each other (S31), and determines whether they are identical to each other (S32). If they are identical to each other, the CPU 20 sets an ID (e.g., a document reference number or a title) of the i-th document (i=1) in a register (S33). If the ID of the retrieval label and the ID of the label image information item read out of the label managing table are not identical to each other (S32), or after the ID of the document is set in the register (S33), the CPU 20 determines whether the counter value i has reached a number $i_o$ of all the documents stored in the file storage unit 26 ($i \geq i_o$) (S34). When the counter value i has not reached the number $i_o$, an ID of a label image information item corresponding to the next document and the ID of the retrieval label are compared with each other.

After this, until the counter value i reaches the number $i_o$, the above processing steps are repeatedly performed. When the counter value i reaches the number $i_o$ (when label image information items corresponding to all the documents are completely compared with the retrieved label), the CPU 20 causes the display device 25 to display a list of the IDs of the documents set in the register at this time (S35). That is, the list of the documents to which, for example, the mark ○ is attached is displayed on the screen of the display device 25.

When the user operates the hand-writing input device 23 so that one of the documents in the list is selected, the selected document is read out of the file storage unit 26 and displayed on the screen of the display device 25.

In the process carried out in accordance with the procedure shown in FIG. 12, when there is no label image information identical to the retrieval data (S36, YES), the CPU 20 causes the display device 25 to display a message indicating that there is no document (image data document) including the retrieval key (S37). After this, the process is terminated.

In the system as has been described above, image data (one of hand-written ○, ×, Δ and □ marks) included in an image data document is miniaturized as a label image information item. The relationship between the label image information item and the image data document is managed. In this state, when a hand-drawn image data is supplied as a retrieval key, an image data document corresponding to the image data is retrieved.

In the above example, image data (the mark) attached to the document to be retrieved is input by the user. However, when increasing the number of types of the image data, it is difficult for the user to memorize all of the types of the image data. In such a case, to easily specify image memory corresponding to a document to be retrieved, the CPU 20 may perform a process in accordance with a procedure shown in FIG. 13 before the retrieval process as has been described above.

Figure 13:
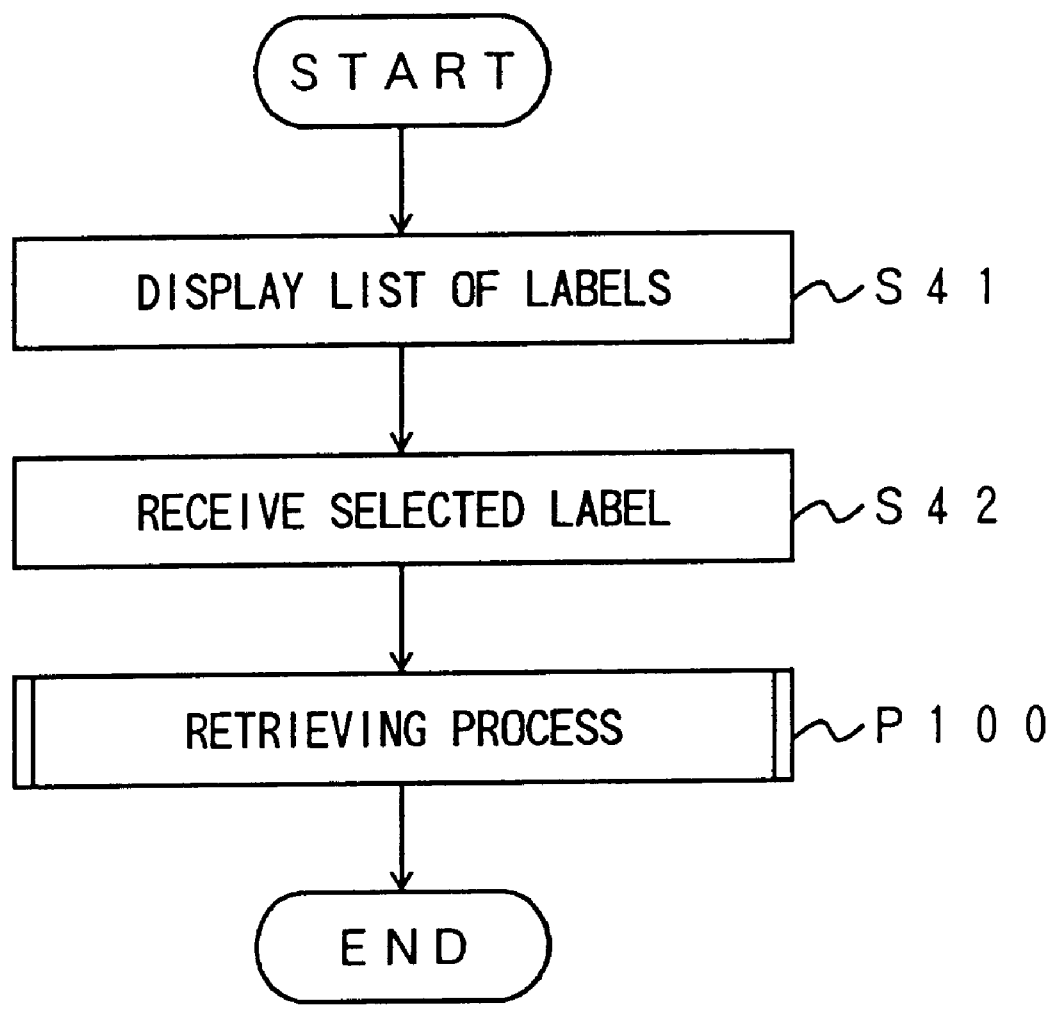
FIG. 13 is a flowchart illustrating an example of a processing procedure for displaying a list of label information items.

Referring to FIG. 13, the CPU 20 reads out, with reference to the label storing position table (see FIG. 10), respective label image information items from the file storage unit 26, and causes the display device 25 to display a list of the label image information items (miniatured images) (S41). In this state, when the user operates the hand-writing input device 23 to specify one of the label image information items displayed on the screen of the display device 25, the CPU 20 receives the specified label image information item (S42). After this, the CPU 20 uses the received label image information item as the retrieval data and carries out the retrieval process P100 in accordance with the procedure shown in FIG. 12.

Figure 3B:
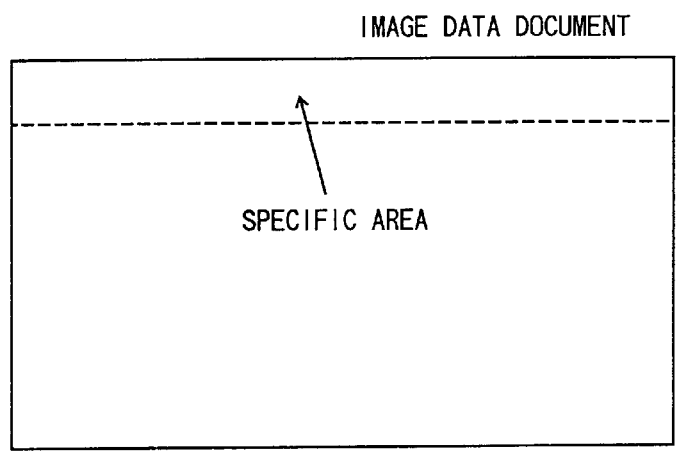
Figure 3C:
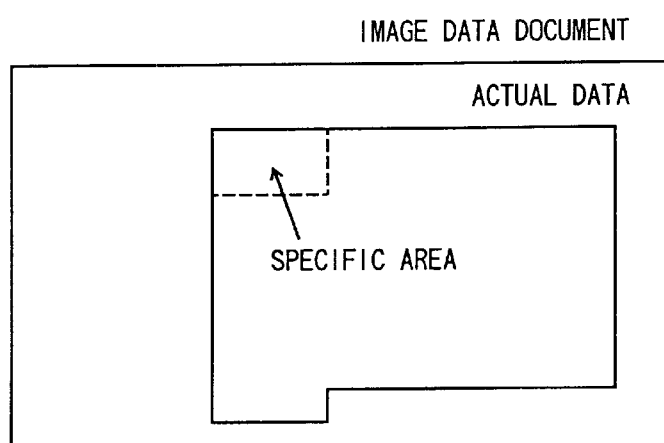

In the above examples, the leading portion of each document is decided as the specific area as shown in FIG. 3A. However, the specific area is not limited to this. The leading line of an image data document as shown in FIG. 3B, and the leading portion of actual image data area as shown in FIG. 3C, may be decided as the specified area from which image data should be extracted.

Further, in the above embodiments, an image which is the base of the label information item is the mark which is drawn by the user to classify the document. However, the base of the label information is not limited to this. Image data including a predetermined area of a document which is made by the user (a predetermined part of image data unfolded on the memory unit 22), or image data representing a page of a document (image data for one page unfolded on the memory unit 22) is miniaturized. A label image information item may be made based on the miniaturized image data.

In such a case, a large number of types of label image information items for respective documents which are made by the user are made. Thus, it is difficult for the user to specify one label image information to retrieve a document. To eliminate this disadvantage, before the retrieval process starts, the process is carried out in accordance with the procedure shown in FIG. 13. That is, a list of label image information items (miniaturized image) is displayed on the screen of the display device 25. One of the label image information items which is specified is used as a retrieval data, and a document corresponding to the retrieval data is retrieved.

In the respective examples as has been described above, a single label information item is made for a document. However, the number of label information items made for a document is not limited to this. A plurality of numbers of label information items may be made for a document. In this case, relationships between label information items and documents are managed so that the plurality of numbers of label information items correspond to a single document.

Figure 14:
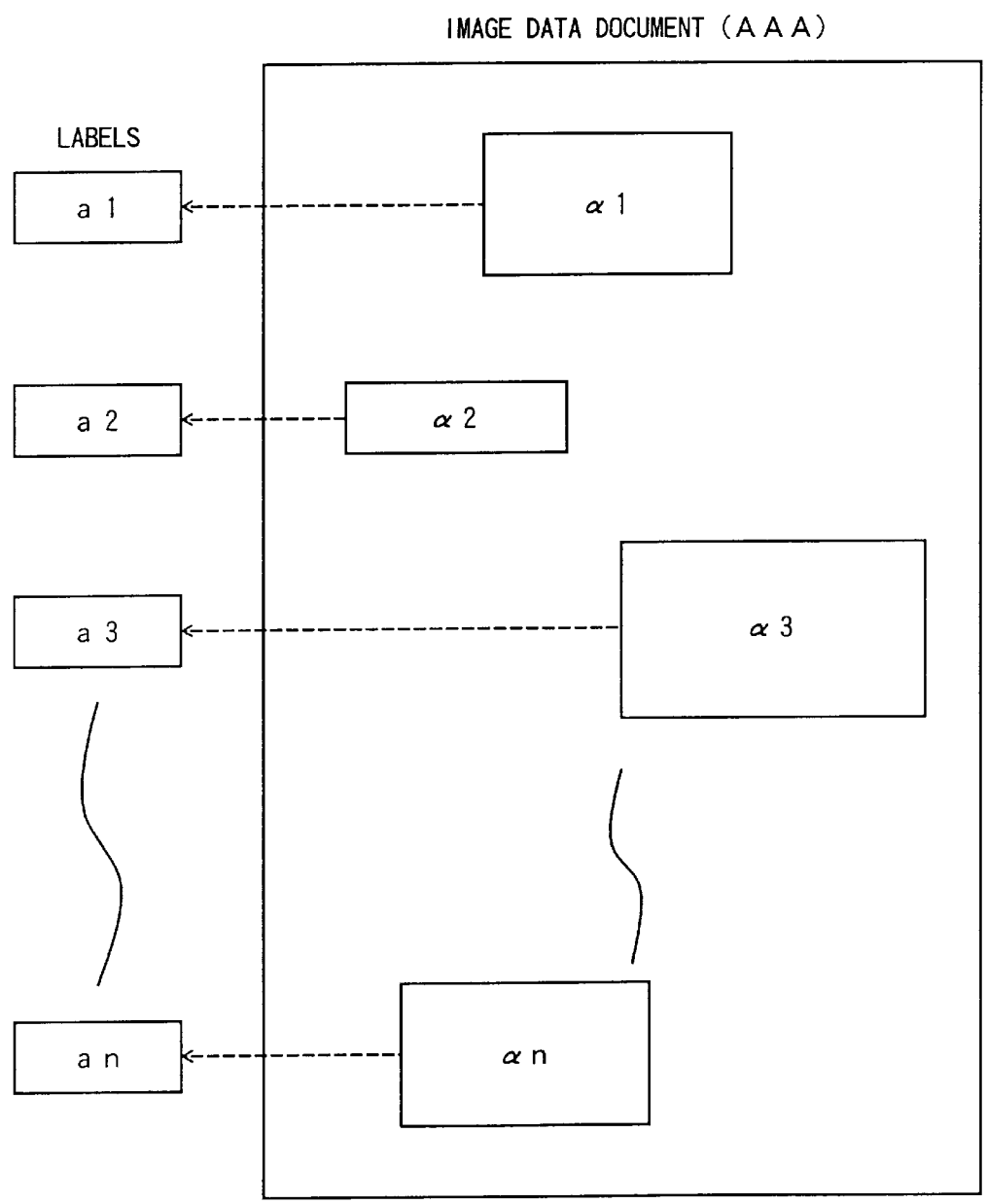
FIG. 14 is a diagram illustrating relationships between label information and image data in an image data document which was made or edited.

As shown in FIG. 14, in an image data document (AAA) which was made by the user, image data portions β1, β2, .

Figure 15:
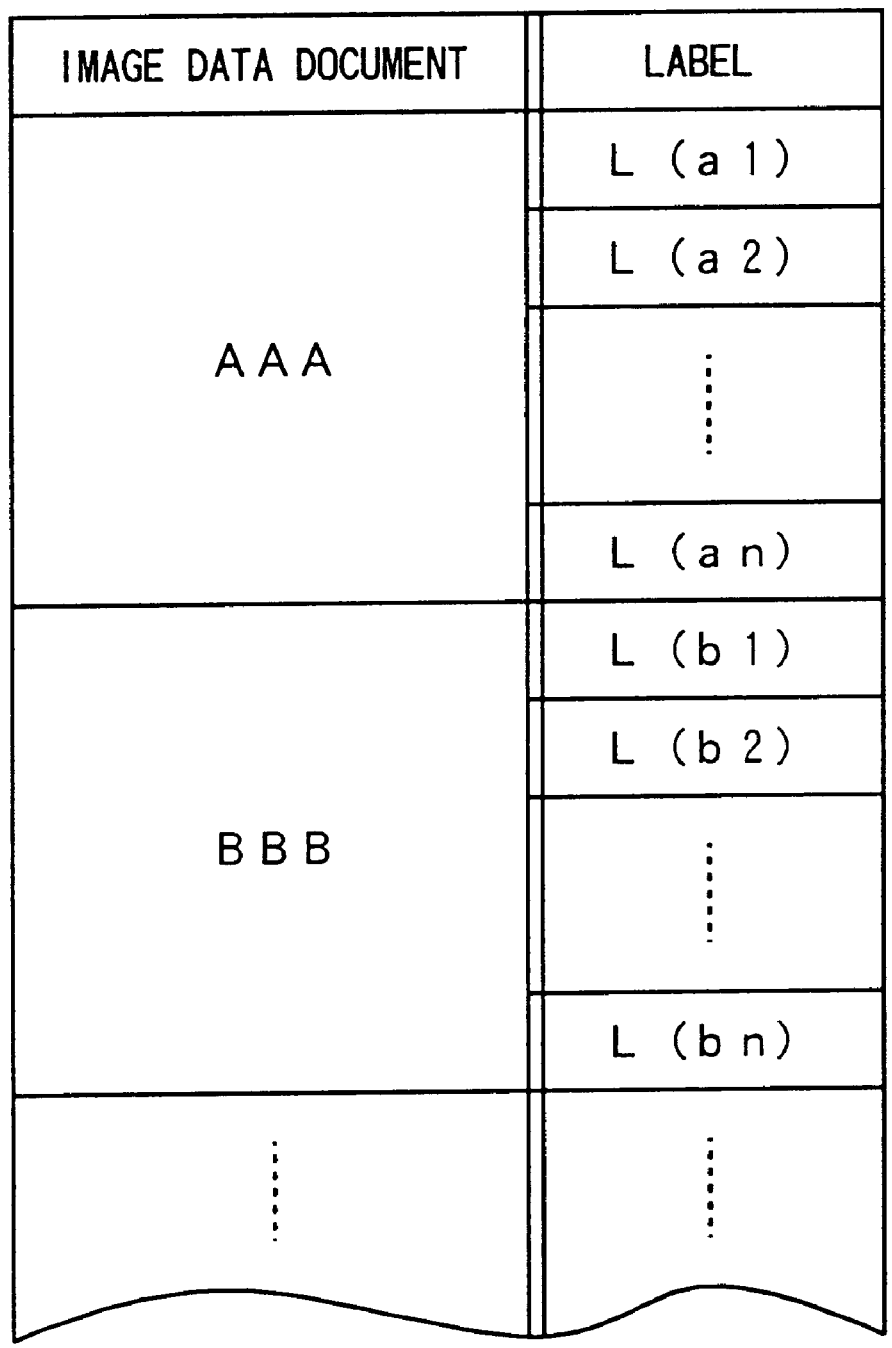
FIG. 15 is a diagram illustrating a label management table indicating relationships between documents and label information.

..., βn are specified. Each of the image data portion is miniaturized (normalized)(the thumb-nail process), so that corresponding label information items a1, a2, ..., an are made. The label information items a1, a2, ..., an are stored in the storage unit along with the image data document (AAA). A relationship between the document (AAA or BBB) and the label information items is entered in a label managing table as shown in FIG. 15.

In this case, in accordance with the same process as that described above (see FIG. 12), when a label information item is specified as retrieval data, an image data document corresponding to the label information item is retrieved with reference to the label managing table.

In the respective examples as has been described above, a document is retrieved based on a label information item. In the following example, image data is retrieved from a document.

Figure 16:
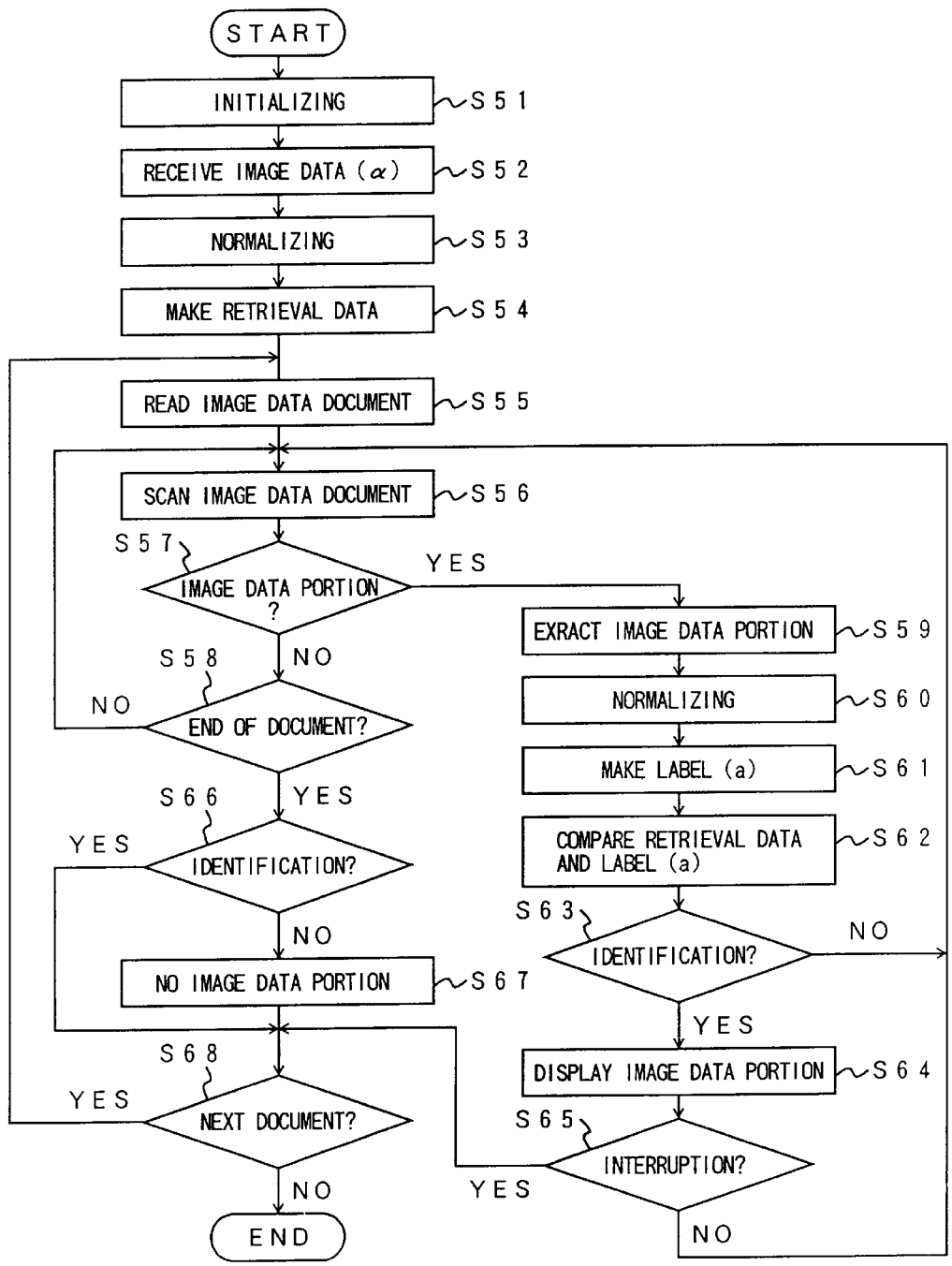
FIG. 16 is a flowchart illustrating an example of a retrieval processing procedure for image data.

Such a retrieval process is carried out in accordance with a procedure as shown in FIG. 16.

Referring to FIG. 16, when a user inputs an image data item (β) which is a retrieval key using the hand-writing input device 23, the CPU 20 initializes various factors (S51), and receives the image data item (β)(S52). The CPU 20 then normalizes the received image data item (S53) and makes, from the normalized image data item (the miniatured image), retrieval data corresponding to a label image information item to be retrieved (S54).

After this, the CPU 20 reads out a image data document from the file storage unit 26 and unfolds the image data document on the memory unit 22 (S55). The CPU 20 then scans the image data document unfolded on the memory unit 22 (S56) and determines whether an image portion exists in the image data document (S57). When it is determined that an image portion exists in the image data document before the end point of the image data document is scanned (S58), the CPU 20 extracts the image portion from the image data document (S59).

After the image portion is extracted as described above, the CPU 20 normalizes the extracted image portion (the normalizing process) (S60). The CPU 20 then makes a label information item (a)(a miniaturized image) from the normalized image data (S61). The CPU 20 determines whether the retrieval data obtained in step S54 and the label information item (a) are identical to each other (S62). In this determination process, it is determined that a label information item having a similarity of a predetermined level with respect to the retrieval data is substantially identical to the retrieval data in the same manner as in the above case (see FIG. 12).

When it is determined that the retrieval data and the label information item (a) are identical to each other, the CPU 20 causes the display device 25 to display a message indicating that the extracted image portion is identical to the retrieval data (S64). After this, the CPU 20 determines whether an operation for interrupting the process is carried out (S65). If the operation for interrupting the process is not carried out, the CPU 20 starts scanning the image data document again, and continuously carries out the steps for extracting a image data portion and for determining whether the extracted image data portion and the retrieval data are identical to each other (S56–S65).

On the other hand, the extracted image data portion and the retrieval data are not identical to each other, the CPU 20 continuously scans the image data document (S63–S65).

The above steps are repeated. When the end of the image data document is completely scanned, the CPU 20 determines whether an image data portion identical to the retrieval data was detected in the above process (S66). If an image data portion identical to the retrieval data was not detected in the above process, the CPU 20 causes the display device 25 to display a message indicating that the image data portion corresponding to the input label information item (a) does not exist in the image data document (S67).

After this, the CPU 20 determines whether the process for the next image data document has been requested (S68). If the process for the next image data document has been requested, the next image data document is read out as a document to be processed from the file storage unit 26, and the next image data document is then unfolded on the memory unit 22 (S68→S55). After this, the above process for the next image data document is carried out.

If it is determined that the operation for interrupting the process has been carried out, after the message indicating that the extracted image data portion is identical to the retrieval data is displayed on the screen of the display device 25, the CPU 20 interrupts the retrieval process and determines whether the retrieval process for the next document should be carried out (S68).

According to the retrieval process as has been described above, image data identical to image data input by the user using the hand-writing input device 23 can be retrieved from each image data document.

In the system in which the document retrieval process is carried out based on the label information, the label managing table indicating the relationships between the label information items and image data documents is used. However, the document retrieval process is not limited to this. The document retrieval process may be carried out without using the label managing table in the following manner.

Every time retrieval data is supplied, image data is read out of a predetermined area of the image data document. The image data read out of the image data document is compared with the retrieval data and it is determined whether they are identical to each other.

Figure 17:
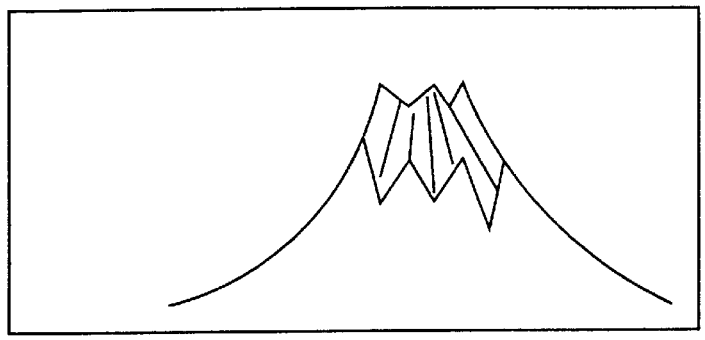
FIG. 17 is a diagram illustrating an example of image data.
Figure 18A:
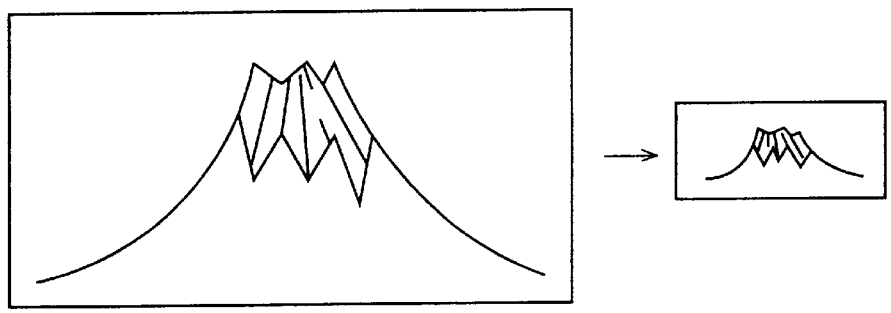
FIGS. 18A and 18B are diagrams illustrating examples of labels.
Figure 18B:
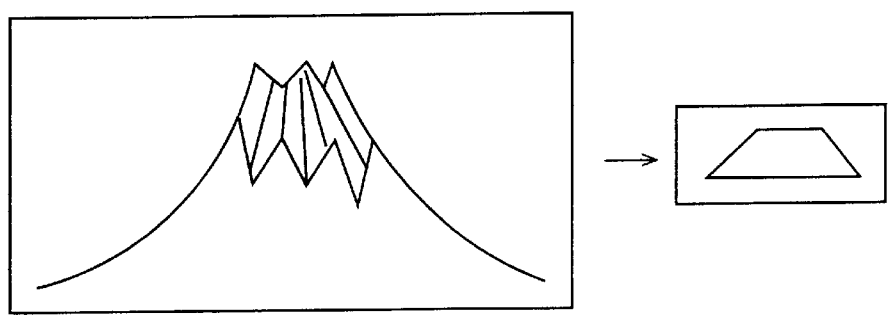

As has been describe above, when image data represents "Mt. Fuji" as shown in FIG. 17, the image of "Mt. Fuji" is miniaturized as shown in FIG. 18A so that the miniaturized image is uses as a label information. In addition, a trapezoid line drawing which is represented by skeleton data of "Mt. Fuji", as shown in FIG. 18B, may be also recorded as label information (entered in the label managing table).

In the respective examples, the label information is made from the image data. However, the label information is not limited to this. The label information can be from audio data or complex data including image data and audio data.

The description has been given of the embodiment in which a system is constituted in the portable computer. However, the present invention is not limited to this. The system according to the present invention can be constituted in desk-top computers and lap-top computers and other types of computers. In this case, the file storage unit 26 is formed of a hard disk unit. Various types of programs can be supplied to the system using a recording medium, such as a CD-ROM, a floppy disk, a memory card, or the like.

The present invention is not limited to the aforementioned embodiments, and other variations and modifications may be made without departing from the scope of the claimed invention.

What is claimed is:

1. An information processing apparatus for document processing, said apparatus comprising:

an extracting unit extracting non-coded data from a document;

a label information making unit making a first label information item from feature data extracted from the extracted non-coded data, the label information item representing a feature of the extracted non-coded data;

a management unit managing a plurality of documents, each of the documents corresponding to a label information item representing a feature of non-coded data included in the document;

an input control unit receiving input data as a retrieval key input by a user using a user input device, the input data representing a second label information item; and a retrieval unit receiving the retrieval key, successively comparing the retrieval key to one or more of the label information items to which the plurality of documents respectively correspond, generating a comparison result for the retrieval key, and retrieving from the plurality of documents a document corresponding to a specific compared label information item when the comparison result indicates that the specific compared label information item is substantially identical to the second label information item.

2. The information processing apparatus as claimed in claim 1, further comprising:

a list displaying unit displaying a list of the label information items corresponding to respective ones of the plurality of documents, a label information item selected from the list being specified as the retrieval key.

3. The information processing apparatus as claimed in claim 1, wherein said extracting unit extracts image data as the non-coded data.

4. The information processing apparatus as claimed in claim 1, wherein said extracting unit extracts the specified non-coded data from a predetermined area of the document.

5. The information processing apparatus as claimed in claim 1, further comprising a list displaying control unit causing a display unit to display a list of respective label information items corresponding to the plurality of documents, the specified label information item being selected from the displayed list.

6. The information processing apparatus as claimed in claim 1, wherein the feature of the extracted non-coded data is a quantitative non-character feature and the first label information item represents the quantitative non-character feature as an encoded numeral.

7. The information processing apparatus as claimed in claim 1, wherein the user input device is a hand-writing input device and the input data comprises image data.

8. An information processing apparatus for document processing, said apparatus comprising:

an input control unit receiving input data as a retrieval key input with a retrieval request by a user using a user input device, the input data representing a first label information item;

an extracting unit extracting, in response to the retrieval request, non-coded data included in a specific document;

a label information making unit making a second label information item based on the extracted non-coded data, the second label information item representing a feature of the extracted non-coded data; and a determination unit successively comparing retrieval data to one or more label information items including the second label information item and generating a determination result, each compared label information item representing a feature of non-coded data included in a corresponding document, the retrieval data being based on the retrieval key, and the specific document being selected as a retrieval result when the determination result indicates that the first label information item is substantially identical to the second label information item.

9. The information processing apparatus as claimed in claim 8, wherein said extracting unit extracts image data as the non-coded data.

10. The information processing apparatus as claimed in claim 10, wherein said extracting unit extracts the non-coded data from a predetermined area of the document.

11. The information processing apparatus as claimed in claim 8, wherein the feature of the extracted non-coded data is a quantitative non-character feature and the second label information item represents the quantitative non-character feature as an encoded numeral.

12. The information processing apparatus as claimed in claim 8, wherein the user input device is a handwriting input device and the input data comprises image data.

13. A computer readable recording medium encoded with a program for document processing, said program comprising the functions of:

extracting non-coded data included in a specific document;

making a first label information item from feature data extracted from the non-coded data, the first label information item representing a feature of the non-coded data;

generating linking information representing a relationship between the specific document and the first label information item for management of the specific document using the linking information;

receiving input data as a retrieval key input by a user with a retrieval request, the input data representing a second label information item;

successively comparing the retrieval key to one or more label information items and generating a comparison result, each compared label information item representing a feature of non-coded data in a corresponding document managed among a plurality of documents using linking information representing a relationship between the corresponding document and the compared label information item; and retrieving a document from among the plurality of documents when the retrieved document corresponds to a specific compared label information item and the comparison result indicates that the second label information item is substantially identical to the specific compared label information item.

14. The recording medium as claimed in claim 13, wherein said program further comprises the function of causing a display unit to display a list of respective label information items corresponding to the plurality of documents, the specified label information item being selected from the displayed list.

15. The computer readable recording medium as claimed in claim 13, wherein:

said program further comprises the function of editing a selected document by modifying document data corresponding to a predetermined area of the document, the modified document data comprising non-coded data; and the non-coded data extracted from the specific document is the non-coded data comprised in the modified document data when the specific document is the edited selected document.

16. A computer readable recording medium encoded with a program for document processing, said program comprising the functions of:

receiving input data as a retrieval key input by a user with a retrieval request, the input data representing a first label information item;

extracting non-coded data included in a specific document when the retrieval request is received;

making a second label information item based on the non-coded data, the second label information item representing a feature of the non-coded data; and successively comparing retrieval data to one or more label information items including the second label information item to generate a determination result, each compared label information item representing a feature of non-coded data included in a corresponding document, the retrieval data being based on the retrieval key, and the specific document being retrieved as a retrieval result when the determination result indicates that the first label information item is substantially identical to the second label information item.

17. A document processing apparatus, comprising:

a document manager managing a plurality of documents according to respective label items corresponding to the documents, each document including non-coded data, each label item being generated from non-coded data extracted from the corresponding document and representing a feature of the extracted non-coded data;

an input control unit receiving input data as a retrieval key input by a user using a user input device, the input data representing a specified label information item; and a search engine comparing the label items of the plurality of documents to the retrieval key and retrieving a document having a corresponding label item substantially identical to the specified label information item.

18. A document processing method, comprising:

managing a plurality of documents according to respective label items corresponding to the documents, each document including non-coded data, each label item being generated from non-coded data extracted from the corresponding document and representing a feature of the non-coded data extracted from the corresponding document;

receiving input data as a retrieval key input by a user with a retrieval request, the input data representing a specified label item; and retrieving a document corresponding to a label item substantially identical to the specified label item by comparing the label items of the plurality of documents to the retrieval key.

19. The document processing method as claimed in claim 18, further comprising:

editing a selected document by modifying document data corresponding to a predetermined area of the document, the modified document data comprising non-coded data; and adding the edited selected document to the plurality of documents by extracting the non-coded data from the modified document data and generating therefrom a label item for the edited selected document.

20. A computer-readable medium encoded with a program for document processing, said program comprising:

managing a plurality of documents according to respective label items corresponding to the documents, each document including non-coded data, each label item being generated from non-coded data extracted from the corresponding document and representing a feature of the non-coded data extracted from the corresponding document;

receiving input data as a retrieval key input by a user with a retrieval request, the input data representing a specified label item; and retrieving a document corresponding to a label item substantially identical to the specified label item by comparing the label items of the plurality of documents with the retrieval key.

* * * * *

UNITED STATES PATENT AND TRADEMARK OFFICE
CERTIFICATE OF CORRECTION

PATENT NO.:     6,078,915
DATED      :    June 20, 2000
INVENTOR(S):    Toru OKAWA et al.

It is certified that error appears in the above-identified patent and that said Letters Patent is hereby corrected as shown below:

Col. 13,     line 36, delete "specified".

Signed and Sealed this

Twenty-fourth Day of April, 2001

Attest:

NICHOLAS P. GODICI

Attesting Officer    Acting Director of the United States Patent and Trademark Office